Aug. 31, 1948.　　C. E. BRANICK　　2,448,414
APPARATUS FOR LIFTING AND SUPPORTING
RIM-EQUIPPED TIRES.
Filed May 25, 1945　　2 Sheets-Sheet 1
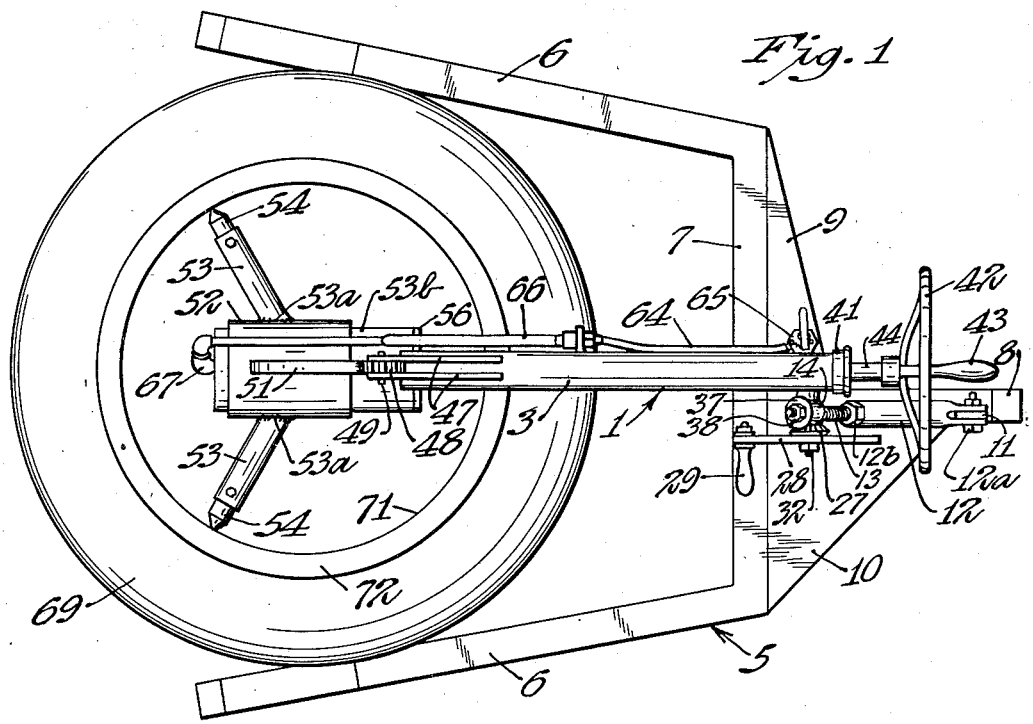
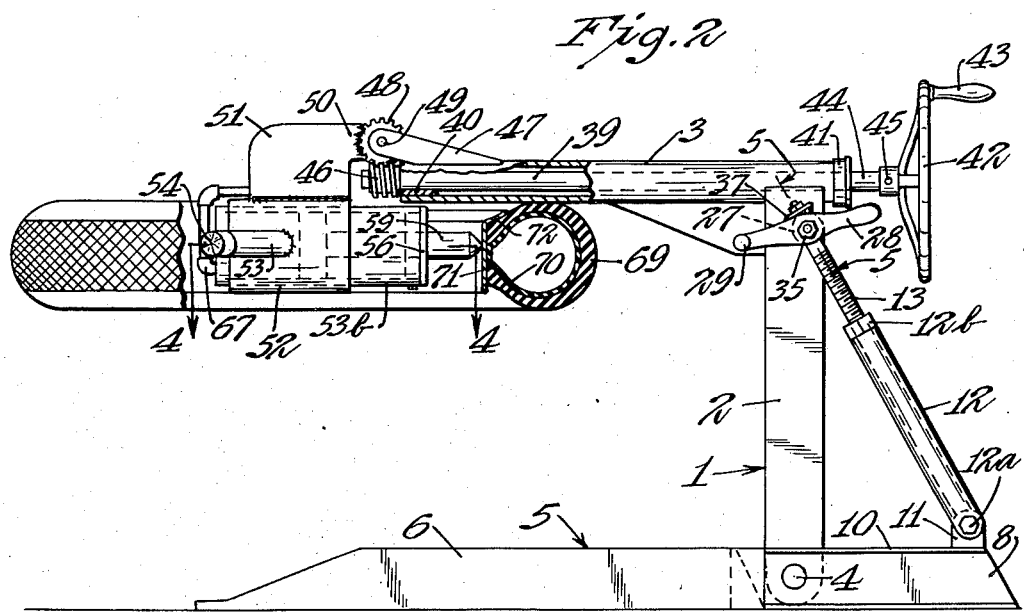
Inventor
Charles E. Branick
By Merchant & Merchant
Attorneys Aug. 31, 1948.  C. E. BRANICK  2,448,414
APPARATUS FOR LIFTING AND SUPPORTING
RIM-EQUIPPED TIRES
Filed May 25, 1945  2 Sheets-Sheet 2
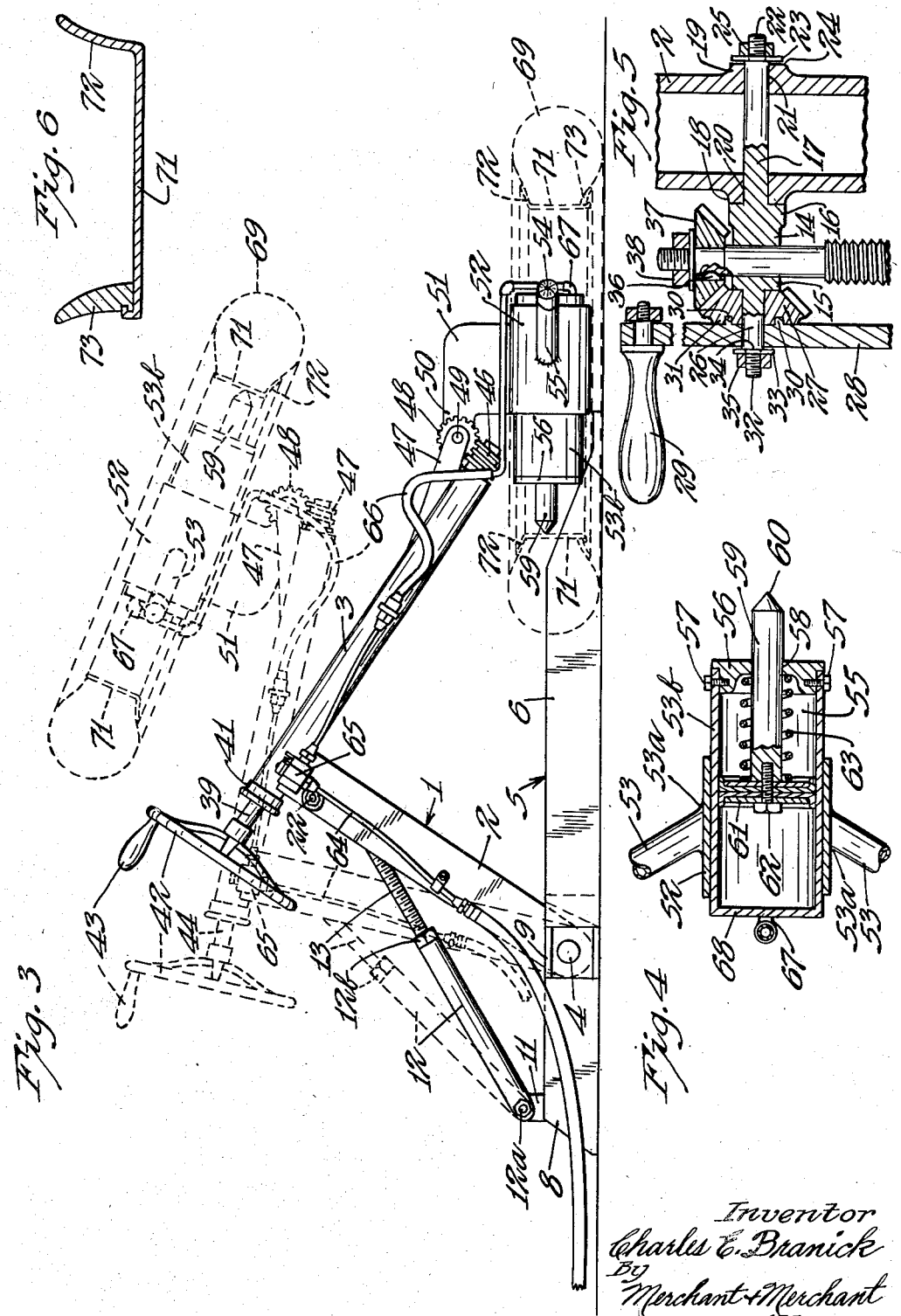
Inventor
Charles E. Branick
By
Merchant + Merchant
Attorneys Patented Aug. 31, 1948

2,448,414

UNITED STATES PATENT OFFICE 2,448,414

APPARATUS FOR LIFTING AND SUPPORTING RIM-EQUIPPED TIRES

Charles E. Branick, Fargo, N. Dak.

Application May 25, 1945, Serial No. 595,782

4 Claims. (Cl. 144—288)

My invention relates generally to machinery or equipment for the handling of rim equipped pneumatic tires, and more specifically to a device for facilitating the application and removal of pneumatic tires from their rims.

As pneumatic tires have increased in size in late years, they have become so heavy and clumsy to handle that the problem of mounting them on and dismounting them from their heavy steel rims has been a serious one. Particularly is this true in the matter of dismounting wherein the rim should be elevated from the floor, both for convenience of operation and to facilitate the removal of the tire therefrom.

With these problems in mind it is a further object of my invention to provide a device which can pick a heavy rim and tire off the floor, lift the same up to a level where a man can work upon the same without bending over, and which is capable of turning the tire and rim approximately 180° on a horizontal axis so that any desired position of the tire and rim may be had to further facilitate the work being done.

The above and other objects of my invention will become apparent from the following specification and attached drawings in which like characters indicate like parts throughout the several views.

Referring to the drawings:

Fig. 1 is a top elevation of my novel structure;

Fig. 2 is a side elevation thereof, some parts being broken away and shown in section;

Fig. 3 is also a side elevation but taken from the side opposite that of Fig. 2 one position of the device being shown in dotted lines;

Fig. 4 is an enlarged fragmentary section taken on the line 4—4 of Fig. 2;

Fig. 5 is an enlarged fragmentary section taken on the line 5—5 of Fig. 2; and

Fig. 6 is an enlarged fragmentary view of the rim having a removable snap ring.

Referring more specifically to the drawings, the numeral 1 indicates an L-shaped frame made up of an upright supporting member 2, shown as being preferably in the nature of a square steel tube, and an outwardly projecting cross sectionally circular tubular member 3 rigidly secured to the upper end thereof. Upright member 2 is horizontally, pivotally anchored at 4 to a suitable base 5. Base 5 is generally U-shaped and is made up of forwardly diverging feet 6 connected at their inner ends by a transverse member 7. Preferably, and as shown, the members 6 and 7 are channel irons welded or otherwise rigidly secured together. A rearwardly projecting portion of the frame is made up of a channel iron 8 which is rigidly joined to the central portion of transverse member 7 and projects therefrom at a 90° angle, and also the triangular reinforcing plates 9 and 10. The plate 9 and rearwardly projecting channel iron 8 are spaced apart to loosely receive the lower end of upright 2.

Projecting upwardly from the outer extremity of base member 8 is an ear 11 to which a tubular member 12 is pivotally secured by means of a bolt and nut combination 12a. The outer or upper end of tubular member 12 has a nut 12b welded thereto to receive a threaded shaft 13. The outer end of threaded shaft 13 is journalled in a collar 14. Collar 14 on its opposite sides has a pair of built up bearing bosses 15 and 16. Radiating from boss 16 and at 90° from the axis of collar 14 is a shaft 17. Upright 2 is provided with a built up bearing boss 18 on one side thereof and another such boss 19 on the opposite side thereof. Bosses 18 and 19 are provided with openings 20 and 21, respectively, which receive the shaft 17 and act as a journal therefor. Shaft 17 is provided with a reduced threaded end portion 22. An enlarged washer 23 abuts against the shoulder 24 on shaft 17 and is held rigidly in position by means of a nut 25. In this manner shaft 17 is prevented from being removed by endwise thrust. Projecting from bearing boss 15 and in alignment with shaft 17 is a stub shaft 26, welded or otherwise made fast to boss 15 and collar 14. Journalled on stub shaft 26 is a bevelled gear 27 and a crank 28 having a horizontally projecting handle 29. As will be observed by reference to Fig. 5, crank 28 is provided with a plurality of circumferentially spaced pins 30 which fit into recesses in a boss 31 on the outer face of gear 27, thus assuring rotation of the gear 27 with the crank 28. Stub shaft 26 is also provided with a screw threaded reduced end portion 32. An enlarged washer 33 which abuts against the shoulder 34 is held securely in place by a nut 35 thus preventing the accidental removal or separation of gear 27 and crank 28.

Mounted on the outer end of the angularly disposed threaded shaft 13 and made fast therewith by means of a key 36 is a second bevelled gear 37 which intermeshes with bevelled gear 27. Gear 37 is held rigidly in place by a burr or nut 38.

Extending axially through tubular member 3 of frame 1 with its ends projecting out from both ends thereof is an elongated shaft 39. Shaft 39 is journalled for rotation in bearings 40 in the front or free end of tubular member 3 and 41 in the rear end thereof. A vertically disposed wheel 42 having a horizontally projecting handle grip 43 is rigidly secured to rearwardly projecting end 44 of shaft 39 by means of a bolt or rivet 45. At the front or free end of shaft 39 a worm gear 46 is rigidly secured for rotation therewith.

A pair of upwardly and forwardly projecting supporting arms 47 on the free end of member 3 supports a spur gear 48 which is horizontally pivoted thereto at 49. The teeth of spur gear 49 are in mesh with the teeth of worm gear 46. With reference to Fig. 2, the back face of spur gear 48 is welded or otherwise made fast to a reduced supporting arm 50 of a vertically disposed supporting flange 51 which is welded or otherwise made fast to a tubular reinforcing sleeve 52. Radiating from the tubular reinforcing sleeve 52 are a pair of fixed dogs 53 which have been secured thereto by welding as indicated at 53a. Tubular reinforcing sleeve 52 in turn encompasses and is welded to a cylindrical tubular body 53b, all as shown in Fig. 4.

Referring particularly to Figs. 2 and 4, it will be observed that tubular body portion 53b is provided with a cylindrical bore 55. An airtight plate 56, held securely in place by means of set screws 57, is provided with a central aperture 58. A plunger element 59 is positioned axially in cylindrical bore 55 and extends outwardly through the central aperture 58 in cover plate 56. On its outer end, plunger 59 is provided with a rim engaging point 60 and its inner end is secured to piston 61 by means of a set screw 62, or the like. A coil spring 63, interposed between end plate 56 and piston member 61, tends to bias said piston and plunger in a retracted position. It will be observed that cylindrical bore 55 provides a fluid chamber into which air under pressure is forced to enter or permitted to escape by means of an air line 64, a valve 65, a flexible hose section 66, and a nipple 67 opening into said chamber through an integral end plate 68.

Valve 65 is a so-called three-way valve of the type disclosed and claimed in my Patent No. 2,310,892, issued February 9, 1943.

It will be observed that tubular body 53b together with the stationary dogs 53, the piston 61, and the plunger element 59 constitute an expanding mandril, the operation of which will be more fully explained hereinafter.

In Figs. 1, 2 and 3 my novel device is shown as demonstrating its utility in combination with a tire and rim combination, and in which the tire casing bears the numeral 69, the tube the numeral 70, and a conventional rim, the number 71. Rim 71 has an integrally formed bead engaging flange 72 on one side thereof and a removable bead engaging flange 73, in the form of a resilient snap ring, on the other side thereof.

*Operation*

In the event that a tire and rim combination is too heavy to be conveniently lifted, it is placed on the floor in a horizontal position, immediately below the tubular body portion 53b of the expanding mandril, as illustrated in Fig. 3. The crank 28 is then turned in a direction to force the free end of L-shaped frame member 1 to drop down into the center of the rim 70. Rim engaging point 54 of stationary dogs 53 are then made to loosely contact the rim 71. Air under pressure is then permitted to enter chamber 55 through air pipe sections 64, 66, and nipple 67 with a result that piston 61 and plunger 59 are pushed forward until the rim engaging tip 60 bears with considerable pressure against rim 71 as illustrated in Fig. 2. With this three-way engagement of rim 71 by stationary dogs 53 and plunger 59, the outward pressure exerted by the movable plunger 59 is distributed equally between them, so that with sixty or more pounds of air pressure, the holding force is so great that the rim can be lifted or moved to any position without fear of its accidentally breaking loose.

To elevate the tire and rim to a position in which it will be convenient for a man to work upon them, the crank 28 is turned in a direction to raise the mandril equipped end of frame 1 to the position illustrated in Fig. 2. In Fig. 2 it will be observed that the snap ring 73 has already been removed and the tire casing 69 is in an ideal position to be pounded off the rim 71 by blows from a sledge hammer, or the like, exerted on the upper side thereof.

In the event that difficulties are experienced in removal of snap ring 73, or for any other reason, it is desired to elevate the tire to the position shown in dotted lines in Fig. 3, then and in that event, this may be accomplished by turning the wheel 42 whereupon the tire casing 69 and rim 71 are rotated around horizontal axis 49 to any extent up to 180°.

When it is desired to release the rim and tire from the mandril, it is only necessary to permit escape of the air from fluid pressure chamber 55 by opening valve 65, thus allowing coil spring 63 to push piston 61 back to integral end plate 68 so as to thereby retract the plunger 59.

While I have illustrated and described in detail one form of my invention as required by section 4888 of the statutes, it is obvious that said invention is capable of various modifications which do not depart from the spirit of the invention as defined in the appended claims.

What I claim is:

1. In a machine for facilitating the application and removal of pneumatic tires from their rims, an approximately L-shaped frame mounted on a horizontal pivot to a suitable base of support at one of its end portions and projecting upwardly and outwardly from said pivot, means for adjustably moving said frame on its said horizontal pivot to effectively raise and lower the free end portion of said frame, an expanding mandril mounted on a horizontal pivot to the free end portion of said frame, and means for imparting pivotal adjustments to said mandril on said horizontal pivot and retaining such adjustments.

2. In a machine for facilitating the application and removal of pneumatic tires from their rims, a frame horizontally pivoted to a suitable base of support at one end portion and projecting outwardly from said pivot, means for adjustably moving said frame on its said horizontal pivot to effectively raise and lower the free end portion of said frame, an expanding mandril horizontally, pivotally anchored to the free end portion of said frame, and cooperating means on said frame and said mandril for imparting pivotal adjustments to said mandril on said horizontal pivot and retaining such adjustments, said mandril comprising a main body and a plurality of radially projecting dogs having tire rim engaging tips, at least one of said radially projecting dogs being longitudinally extensible and contractable.

3. In a machine for facilitating the application and removal of pneumatic tires from their rims, a supporting base structure, a frame mounted at one of its ends to said base for pivotal movements in a vertical plane, an expanding mandril carried by the free end of said frame, said mandril comprising a fluid pressure cylinder that is mounted on a horizontal pivot on the free end portion of said frame, a piston equipped plunger working in and projecting axially from said cylinder, said plunger having a rim engaging tip, and a plurality of other rim engaging elements mounted in relatively fixed relation with respect to said cylinder.

4. In a machine for facilitating the application and removal of pneumatic tires from their rims, an upright supporting member pivotally secured at its lower end to a suitable base of support, a forwardly-projecting arm secured at its rear end to the upper portion of said supporting member, means for raising and lowering the free end portion of said arm, an expanding mandril horizontally pivotally anchored to the free end portion of said forwardly-projecting arm, means for imparting pivotal adjustments to said mandril about said horizontal axis and retaining such adjustments, said mandril comprising a fluid pressure cylinder, a piston-equipped plunger working in and projecting axially from said cylinder, said plunger having a rim-engaging tip, and a plurality of other rim-engaging elements mounted in relatively fixed relation with respect to said cylinder.

CHARLES E. BRANICK.

REFERENCES CITED

The following references are of record in the file of this patent:

UNITED STATES PATENTS

| Number | Name | Date |
| --- | --- | --- |
| 473,682 | Vanes | Apr. 26, 1892 |
| 776,831 | Geddes | Dec. 6, 1904 |
| 1,309,058 | Arthur | July 8, 1919 |
| 1,399,351 | Lee | Dec. 6, 1921 |
| 1,751,480 | Howell | Mar. 25, 1930 |
| 1,888,834 | Puleo | Nov. 22, 1932 |
| 1,932,302 | Browne | Oct. 24, 1933 |
| 2,065,644 | Bristol | Dec. 29, 1936 |
| 2,213,535 | Seip | Sept. 3, 1940 |
| 2,225,273 | Jacobs | Dec. 17, 1940 |
| 2,383,275 | Scane | Aug. 21, 1945 |